Patented Feb. 15, 1927.

1,617,872

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO THE FIRM: SOCIETY OF CHEMICAL INDUSTRY IN BASLE, OF BASEL, SWITZERLAND.

DYESTUFFS AND PROCESS OF MAKING SAME.

No Drawing. Application filed March 11, 1926, Serial No. 94,039, and in Switzerland March 28, 1925.

The present invention relates to new dyestuffs containing metals. It comprises the new dyestuffs, the process of making the same, and the material dyed with the new dyestuffs.

It has been found that new dyestuffs containing metals may be obtained by treating the azo dyestuffs corresponding with the general formula:

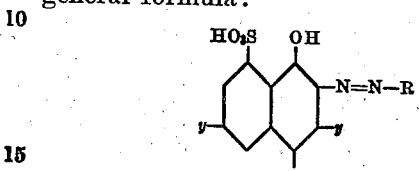

wherein the $y$'s stand for hydrogen atoms which are replaced at least once and at most twice by sulfo groups which latter are not adjacent to each other and of which at least one is in 3-or 4-position, and wherein R stands for a benzene nucleus containing an OH group in ortho-position to the azo-bridge, with agents yielding metals. As such there are to be understood the two metals which yield with ortho-hydroxy-azo dyestuffs valuable complex compounds, i. e. copper and chromium.

The complex metal derivatives of the azo dyestuffs corresponding with the general formula explained above form dark powders, dissolving in water with bluish-red to blackish-violet coloration, and yielding on wool, when dyed from an acid bath, fast bordeaux to violet, blue and black tints which may be very pure.

Example 1.

48.4 parts of the dyestuff from diazotized 4-chloro-2-amino-1-phenol and 1-hydroxynaphthalene-3:8-disulfonic acid corresponding with the formula:

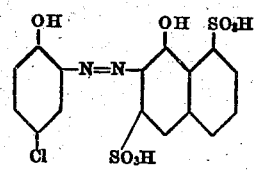

are dissolved in 1000 parts of boiling water. To the solution thus obtained there are added 21 parts of copper sulfate dissolved in 300 parts of boiling water and the whole is boiled for some time, the liberated mineral acid being neutralized by addition of sodium acetate. The dyestuff containing copper is then isolated by addition of common salt. It forms a dark powder, dissolving in water and in dilute caustic soda solution with bluish-red coloration, dyeing wool from an acid bath pure red-violet tints. The isomeric dyestuff from 1-hydroxynaphthalene-4:8-disulfonic acid shows similar properties. The dyestuffs containing copper from 4-nitro-2-amino-1-phenol or picramic acid yield bordeaux tints.

Example 2.

46.8 parts of the dyestuff from diazotized 4-nitro-2-amino-1-phenol and 1-hydroxynaphthalene-4:8-disulfonic acid corresponding with the formula

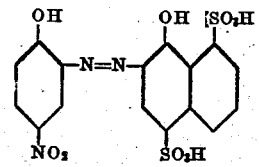

are dissolved in 1000 parts of boiling water, treated with a chromium fluoride solution corresponding with 20 parts of $Cr_2O_3$ and boiled for some time in a reflux apparatus in the presence of glass powder. The complex chromium compound thus obtained is then isolated by evaporation and salting out. It forms a dark powder dissolving in water with bluish-red, in dilute caustic soda solution with red coloration, yielding on wool when dyed from an acid bath fast bordeaux tints. The isomeric dyestuff from 1-hydroxynaphthalene-3:8-disulfonic acid dyes wool violet tints, the dyestuff from 1-hydroxynaphthalene-3:6:8-trisulfonic acid bordeaux tints.

A greenish-grey dyeing product is obtained from 1-hydroxybenzene-2-amino-4-sulfonic-6-carboxylic acid and 1-hydroxynaphthalene-4:8-disulfonic acid, a reddish-blue dyeing product from 1-hydroxynaphthalene-3:8-disulfonic acid and diazotized 4-chloro-2-amino-1-phenol, whereas the isomeric dyestuff from 4-chloro-2-amino-1-phenol and 1-hydroxynaphthalene-4:8-disulfonic acid, dissolving in water with violet, in dilute caustic soda solution with bluish-red coloration, dyes wool violet tints.

Similar products are obtained if instead of chromium fluoride other agents yielding chromium, such as chromium acetate, chromium formate or chromium hydroxide hydrate or alkali metal chromite, are employed.

*Example 3.*

51.4 parts of the dyestuff from diazotized picramic acid and 1-hydroxynaphthalene-4:8-disulfonic acid corresponding with the formula

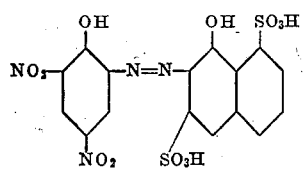

are dissolved in 1500 parts of boiling water. To the solution thus obtained there is added a chromium fluoride solution corresponding with 20 parts of $Cr_2O_3$, the whole being then boiled in the presence of glass powder until the formation of the chromium complex is completed. The new dyestuff thus obtained is isolated by evaporation and salting out. It forms a dark powder dissolving in water and in dilute caustic soda solution with blackish-violet coloration, dyeing wool, when dyed from an acid bath, fast black tints.

The isomeric dyestuff from 1-hydroxynaphthalene-3:8-disulfonic acid shows analogous properties. Similar products are also obtained with other agents yielding chromium.

What we claim is:

1. A process for the production of new dyestuffs containing metals, consisting in treating the azo dyestuffs corresponding with the general formula:

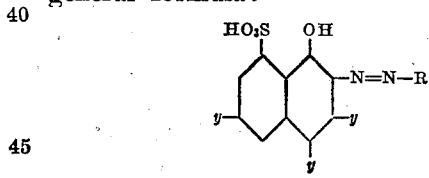

wherein the $y$'s stand for hydrogen atoms which are replaced at least once and at most twice by sulfo groups which latter are not adjacent to each other and of which at least one is in 3- or 4-position, and wherein R stands for a benzene nucleus containing an OH group in ortho-position to the azobridge with agents yielding metals.

2. A process for the production of new dyestuffs containing chromium consisting in treating the azo dyestuffs corresponding with the general formula:

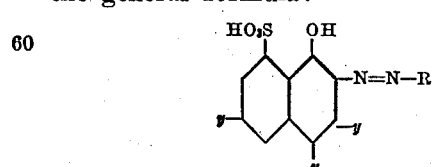

wherein the $y$'s stand for hydrogen atoms which are replaced at least once and at most twice by sulfo groups which latter are not adjacent to each other and of which at least one is in 3- or 4-position, and wherein R stands for a benzene nucleus containing an OH group in ortho-position to the azobridge with agents yielding chromium.

3. A process for the production of new dyestuffs containing chromium consisting in treating the azo dyestuffs corresponding with the general formula:

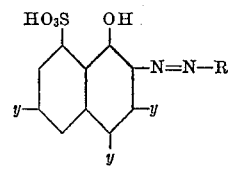

wherein the $y$'s stand for hydrogen atoms which are replaced at least once and at most twice by sulfo groups which latter are not adjacent to each other and of which at least one is in 3- or 4-position, and wherein R stands for a benzene nucleus containing an OH group in ortho-position to the azobridge and, besides, at least one negative group, with agents yielding chromium.

4. A process for the production of new dyestuffs containing chromium consisting in treating the azo dyestuffs corresponding with the general formula:

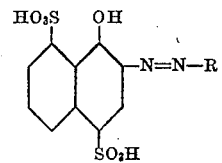

wherein R stands for a benzene nucleus containing an OH group in ortho-position to the azobridge and, besides, a negative group, with agents yielding chromium.

5. As new products the herein described metal compounds of the azo dyestuffs corresponding with the general formula:

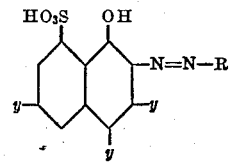

wherein the $y$'s stand for hydrogen atoms which are replaced at least once and at most twice by sulfo groups which latter are not adjacent to each other and of which at least one is in 3- or 4-position, and wherein R stands for a benzene nucleus containing an OH group in ortho-position to the azobridge, which products form dark powders, dissolving in water with bluish-red to blackish-violet coloration, dyeing wool, when dyed from an acid bath, fast bordeaux to violet-blue and black tints.

6. As new products the herein described metal compounds of the azo dyestuffs corresponding with the general formula:

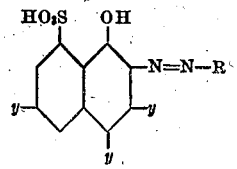

wherein the y's stand for hydrogen atoms which are replaced at least once and at most twice by sulfo groups which latter are not adjacent to each other and of which at least one is in 3- or 4-position, and wherein R stands for a benzene nucleus containing an OH group in ortho-position to the azobridge and, besides, at least one negative group, which products form dark powders, dissolving in water with bluish-red to blackish-violet coloration, dyeing wool, when dyed from an acid bath, fast bordeaux to violet-blue and black tints.

7. As new products the herein described chromium compounds of the azo dyestuffs corresponding with the general formula:

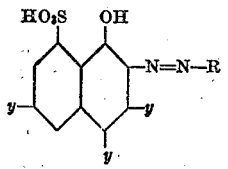

wherein the y's stand for hydrogen atoms which are replaced at least once and at most twice by sulfo groups which latter are not adjacent to each other and of which at least one is in 3- or 4-position, and wherein R stands for a benzene nucleus containing an OH group in ortho-position to the azobridge and, besides, at least one negative group, which products form dark powders, dissolving in water with bluish-red to blackish-violet coloration, dyeing wool, when dyed from an acid bath, fast bordeaux to violet-blue and black tints.

8. As new products the herein described chromium compounds of the azo dyestuffs corresponding with the general formula:

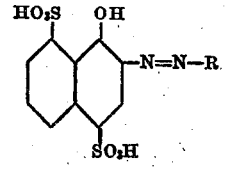

wherein R stands for a benzene nucleus containing an OH group in ortho-position to the azobridge and, besides, at least a negative group, which products form dark powders, dissolving in water with bluish-red to blackish-violet coloration, dyeing wool, when dyed from an acid bath, fast bordeaux to violet-blue and black tints.

9. As new products the herein described chromium compounds of the azo dyestuff corresponding with the formula:

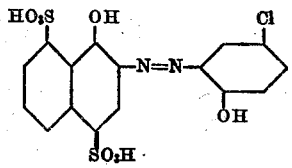

which product forms a dark powder, dissolving in water with red-violet, in dilute caustic soda solution with bluish-red coloration, dyeing wool from an acid bath fast violet tints.

10. Material dyed with the dyestuffs of claim 5.

11. Material dyed with the dyestuffs of claim 6.

12. Material dyed with the dyestuffs of claim 7.

13. Material dyed with the dyestuffs of claim 8.

14. Material dyed with the dyestuffs of claim 9.

In witness whereof we have hereunto signed our names this 1st day of March 1926.

FRITZ STRAUB.
HERMANN SCHNEIDER.